US010432611B2

United States Patent
Luo (10) Patent No.: US 10,432,611 B2
(45) Date of Patent: Oct. 1, 2019

(54) TRANSACTION PROCESSING METHOD AND CLIENT BASED ON TRUSTED EXECUTION ENVIRONMENT

(71) Applicant: Alibaba Group Holding Limited, Grand Cayman (KY)

(72) Inventor: Jinhua Luo, Shanghai (CN)

(73) Assignee: Alibaba Group Holding Limited, Cayman Islands (KY)

( * ) Notice: Subject to any disclaimer, the term of this patent is extended or adjusted under 35 U.S.C. 154(b) by 5 days.

(21) Appl. No.: 15/230,118

(22) Filed: Aug. 5, 2016

(65) Prior Publication Data

US 2017/0041312 A1 Feb. 9, 2017

(30) Foreign Application Priority Data

Aug. 7, 2015 (CN) .......................... 2015 1 0484684

(51) Int. Cl.
*H04L 29/06* (2006.01)

(52) U.S. Cl.
CPC ...... *H04L 63/0823* (2013.01); *H04L 63/0442* (2013.01); *H04L 63/061* (2013.01)

(58) Field of Classification Search
CPC .......................... H04L 63/0442; H04L 63/061
See application file for complete search history.

(56) References Cited

U.S. PATENT DOCUMENTS

| 6,581,162 | B1 | 6/2003 | Angelo et al. |
| 7,062,658 | B1 | 6/2006 | Cheriton et al. |
| 7,500,098 | B2 | 3/2009 | Paatero |
| 2002/0129245 | A1 | 9/2002 | Cassagnol et al. |
| 2006/0039560 | A1 | 2/2006 | Wasilewski |
| 2006/0090084 | A1 | 4/2006 | Buer |
| 2008/0005030 | A1 | 1/2008 | Schlarb et al. |
| 2009/0013393 | A1* | 1/2009 | Xi ........................... G06F 21/31 726/7 |
| 2011/0145562 | A1* | 6/2011 | Mangalore .......... H04L 63/0464 713/151 |

(Continued)

FOREIGN PATENT DOCUMENTS

| CN | 1753359 A | 3/2006 |
| CN | 101340281 A | 1/2009 |

(Continued)

OTHER PUBLICATIONS

PCT Search Report and Written Opinion dated Oct. 24, 2016 for PCT Application No. PCT/US16/45848, 9 pages.

(Continued)

*Primary Examiner* — Hee K Song
(74) *Attorney, Agent, or Firm* — Lee & Hayes, P.C.

(57) ABSTRACT

A transaction processing client based on a trusted execution environment is disclosed. The client verifies a server in a secure environment, obtains a public key of the server upon successful verification, generates a session key and encrypts the session key using the public key in the secure environment, transmits the encrypted session key to the server in a normal environment, encrypts pre-obtained transaction information using the session key in the secure environment, and transmits the encrypted transaction information to the server in the normal environment. The present disclosure effectively ensures the security of user login information and user private information.

20 Claims, 6 Drawing Sheets

(56) References Cited

U.S. PATENT DOCUMENTS

| | | | |
|---|---|---|---|
| 2012/0323717 A1* | 12/2012 | Kirsch | G06Q 20/0855 |
| | | | 705/26.1 |
| 2014/0258736 A1* | 9/2014 | Merchan | G06F 21/62 |
| | | | 713/193 |
| 2015/0039890 A1* | 2/2015 | Khosravi | H04L 9/0841 |
| | | | 713/171 |
| 2015/0180662 A1* | 6/2015 | Cui | H04L 9/0891 |
| | | | 713/176 |
| 2015/0332044 A1* | 11/2015 | Smeets | G06F 21/53 |
| | | | 726/10 |
| 2016/0048840 A1* | 2/2016 | Lee | G06Q 20/40145 |
| | | | 382/124 |
| 2016/0219043 A1* | 7/2016 | Blanke | H04L 9/3263 |
| 2016/0232335 A1* | 8/2016 | Violleau | G06F 21/30 |
| 2016/0254904 A1* | 9/2016 | Hjelm | H04L 9/006 |
| | | | 713/155 |
| 2017/0039389 A1* | 2/2017 | Smith | G06F 21/6263 |

FOREIGN PATENT DOCUMENTS

| | | |
|---|---|---|
| CN | 101916388 A | 12/2010 |
| CN | 101964793 A | 2/2011 |
| CN | 103745155 A | 4/2014 |
| CN | 104010044 A | 8/2014 |
| CN | 104125216 A | 10/2014 |
| CN | 104700268 A | 6/2015 |

OTHER PUBLICATIONS

Chinese Office Action dated Apr. 3, 2019 for Chinese Patent Application No. 201510484684.1, a counterpart foreign appliaction of U.S. Appl. No. 15/230,118, 13 pages.

Chinese search report dated Aug. 7, 2015 for Chinese Patent Application No. 201510484684.1, a counterpart foreign application of U.S. Appl. No. 15/230,118, 2 pages.

* cited by examiner

TRANSACTION PROCESSING METHOD AND CLIENT BASED ON TRUSTED EXECUTION ENVIRONMENT

CROSS REFERENCE TO RELATED PATENT APPLICATION

This application claims foreign priority to Chinese Patent Application No. 2015140484684.1 filed on Aug. 7, 2015, entitled "Transaction Processing Method and Client Based on Trusted Execution Environment", which is hereby incorporated by reference in its entirety.

TECHNICAL FIELD

The present disclosure relates to the field of smart television technologies, and in particular, to methods and clients of processing transactions based on a trusted execution environment.

BACKGROUND

Compared with traditional televisions, smart televisions are able to provide a variety of interactive applications to users, and bring a superior personalized experience effect to the users. However, operating systems of smart terminals are designed mainly to focus on functional requirements, without consideration from the security perspective. Furthermore, corresponding system vulnerabilities are inevitable due to the open, complex and complicated nature of the entire system, leading to a continuous emergence of malicious programs that take advantage of these vulnerabilities to threaten application programs. Currently, typical payment client software is developed based on software solutions, which has a drawback that malicious software, such as phishing software and Trojan viruses, can easily steal information entered by a user, e.g., an account number, a password, and transaction data, etc. Although a number of software protection measures such as firewalls and antivirus software may be used for providing corresponding protection, complete software protection cannot be achieved due to the continuous emergence of a variety of new virus programs and frequent updates and upgrades of the system.

In short, since information, such as account numbers, passwords and transaction data, etc., that is entered by a user of a smart television is stored in insecure memory under existing technologies, these pieces of information can be easily stolen by malicious software.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a transaction processing method and a client thereof based on a trusted execution environment, in order to solve the potential security problem of transaction information of a smart television device in existing technologies.

According to embodiments of the present disclosure, a transaction processing method based on a trusted execution environment is provided. In implementations, a client may perform verification of a server in a secure environment, and obtain a public key of the server upon a successful verification. Moreover, the client may generate a session key in the secure environment, and encrypt the session key using the public key. The client may then transmit the encrypted session key to the server in a normal environment. Furthermore, the client may encrypt pre-obtained transaction information using the session key in the secure environment, and transmit the encrypted transaction information to the server in the normal environment. In implementation, the client may have passed a security check and/or access authorization of the secure environment in advance.

Prior to performing the verification of the server in the secure environment, the client may further download a certificate of the server via a network in the normal environment, and store the certificate of the server in a share buffer. The client may further switch from the normal environment to the secure environment, and obtain the certificate of the server from the share buffer in the secure environment.

When performing the verification of the server in the secure environment, the client may verify the certificate of the server using a pre-downloaded verification key in the secure environment, and store a public key of the certificate of the server in a secure buffer upon successfully verifying the certificate of the server.

In response to encrypting the session key using the public key, the client may further store the encrypted session key in the share buffer, switch from the secure environment to the normal environment, obtain the encrypted session key from the share buffer in the normal environment, and transmit the encrypted session key to the server.

In implementations, the transaction information may include information associated with a login account, a login password and a payment. In implementations, prior to encrypting the pre-obtained transaction information using the session key in the secure environment, the client may further receive the login account in the normal environment, and receive the login password and information of the payment in the secure environment. Alternatively, the client may receive the login account, the login password and the information of the payment in the secure environment.

In implementations, the client may include a smart television client or a set-top box client.

According to the embodiments of the present disclosure, a client is provided, which may include a verification module to verify a server in a secure environment and obtain a public key of the server upon a successful verification thereof; a session key generation module to generate a session key and encrypt the session key using the public key in the secure environment; a first transmission module to transmit the encrypted session key from the client to the server in a normal environment; an encryption module to encrypt pre-obtained transaction information using the session key in the secure environment; and a second transmission module to transmit the encrypted transaction information to the server in the normal environment, wherein the client has passed a security check and/or access authorization of the secure environment in advance.

In implementations, the client may further include a first acquisition module to download a certificate of the server via a network in the normal environment, store the certificate of the server in a share buffer, and obtain the certificate of the server from the share buffer in the secure environment after switching from the normal environment to the secure environment.

In implementations, the verification module may further verify the certificate of the server using a pre-downloaded verification key in the secure environment, and store a public key of the certificate of the server in a secure buffer after successfully verifying the certificate of the server.

In implementations, the session key generation module may further store the encrypted session key in the share buffer. After switching from the secure environment to the normal environment, the first transmission module may obtain the encrypted session key from the share buffer, and transmit the encrypted session key to the server in the normal environment.

In implementations, the transaction information may include information associated with a login account, a login password and a payment. In implementations, the client may further include a second acquisition module to receive the login account in the normal environment, and receive the login password and information of the payment in the secure environment. Alternatively, the client may receive the login account, the login password, and the information of the payment in the secure environment.

In implementations, the client may include a smart television client or a set-top box client.

According to technical solutions of the present disclosure, by performing operations such as a server certificate check, generation and encryption of a session key, secure input and secure transmission of transaction-related information in a secure environment, the security of user login information and user private information is effectively ensured.

BRIEF DESCRIPTION OF THE DRAWINGS

The drawings described herein are used for providing a deeper understanding of the present disclosure, and constitute a part of the disclosure. Illustrative embodiments of the present disclosure and a description thereof are used for illustrating the present disclosure, and should not be construed as improper limitations to the present disclosure. In the drawings.

DETAILED DESCRIPTION

In order to understand the objectives, technical solutions, and advantages of the present disclosure in a better manner, the technical solutions of the present disclosure are clearly and fully described hereinafter with reference to exemplary embodiments and accompanying drawings. Apparently, the described embodiments represent merely a part of and not all of the embodiments of the present disclosure. All other embodiments obtained by one of ordinary skill in the art based on the embodiments of the present disclosure without making any creative effort shall fall within the scope of protection of the present disclosure.

According to an embodiment of the present disclosure, a transaction processing method based on a trusted execution environment is provided. The trusted execution environment (or TEE) technology provides a secure execution environment, so that codes operating in this mode are not attacked by malicious software. According to a basic principle thereof, only trusted codes that pass a signature verification are able to operate in the TEE environment, and sensitive data that is operated by these codes is strictly protected in a secure memory and is not accessed by a non-TEE code. In the present disclosure, two operating modes of environments are included. One is Normal Environment (or Normal World), which is able to execute rich instructions, and is referred to as a Rich Execution Environment (REE). The other mode is Secure Environment (or Secure World), which can only execute trusted instructions, and is referred to as a TEE environment. Moreover, these two operating environments can be switched between each other according to needs.

Figure 1:
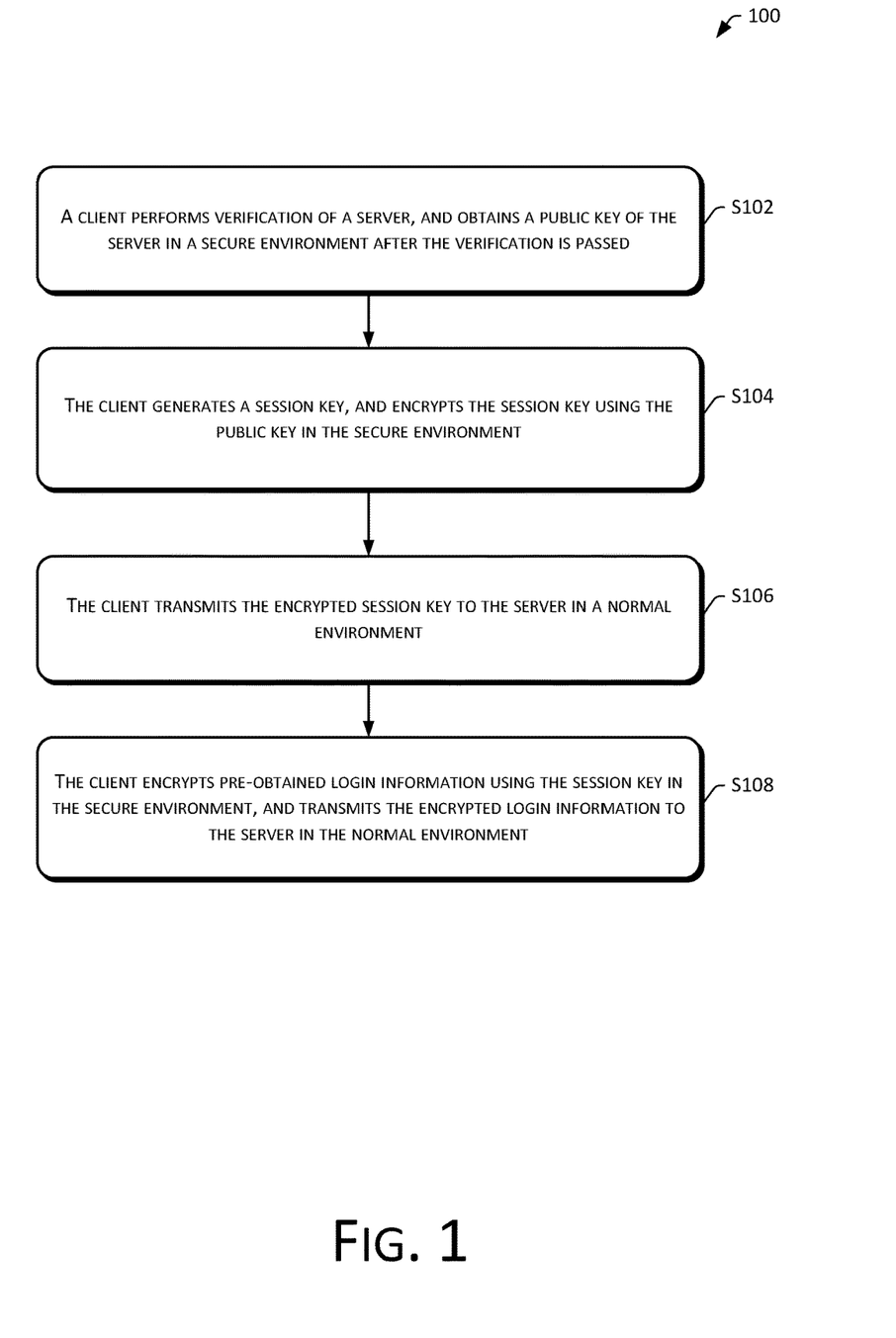
FIG. 1 is a flowchart of a transaction processing method based on a trusted execution environment according to an embodiment of the present disclosure.

FIG. 1 shows a flowchart of a transaction processing method 100 based on a trusted execution environment according to an embodiment of the present disclosure. As shown in FIG. 1, the method 100 may include the following operations.

At S102, a client performs verification of a server in a secure environment, and obtains a public key of the server after the verification is passed, where the client may be a smart television client or a set-top box client.

At S104, the client generates a session key, and encrypts the session key using the public key in the secure environment.

At S106, the client transmits the encrypted session key to the server in a normal environment.

At S108, the client encrypts pre-obtained login information using the session key in the secure environment, and transmits the encrypted login information to the server in the normal environment.

In the embodiments of the present disclosure, the secure environment and the normal environment correspond to a secure region and an insecure region, respectively that are provided by performing a physical separation in CPU hardware through a particular mechanism (e.g., ARM® TrustZone or TI M-Shield mechanism). The secure environment provides a trusted execution environment (TEE) for sensitive applications or data. The secure environment performs a verification and/or access authorization for the client in advance.

The client passes the verification and/or the authorization of the secure environment in advance, and therefore can access a specified buffer (secure buffer) and a specified storage (secure storage) in the secure environment. In other words, the client can perform operations in the secure environment. According to the embodiments of the present disclosure, performing operations such as a server certificate check, generation and encryption of a session key, secure input and secure transmission of transaction-related information in a secure environment can effectively protect the security of user login information and user private information.

Figure 2:
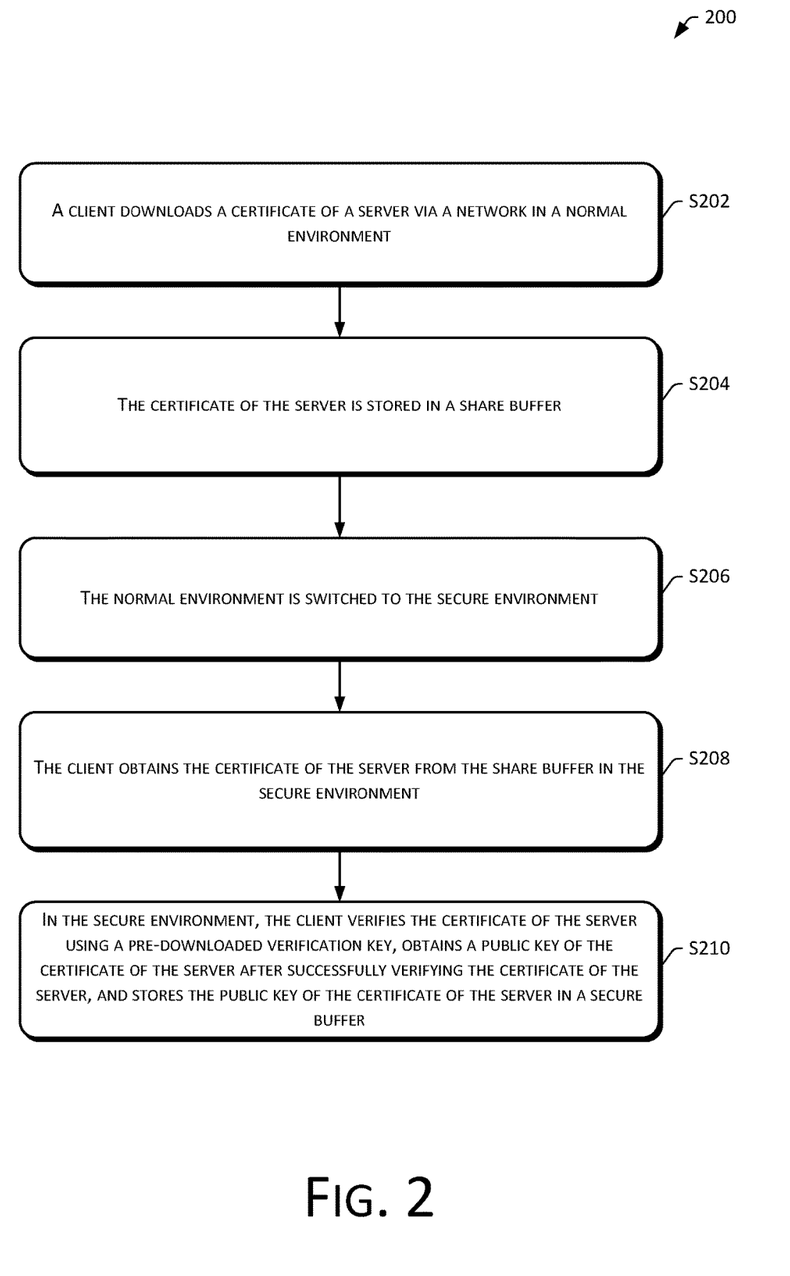
FIG. 2 is a flowchart of verifying a certificate of a server according to an embodiment of the present disclosure.

Exemplary embodiments of the present disclosure are described in detail hereinafter with reference to FIGS. 2-4. FIG. 2 shows a flowchart of verifying a certificate of a server according to an embodiment of the present disclosure. As shown in FIG. 2, a method 200 may include the following operations.

At S202, a client downloads a certificate of a server via a network in a normal environment, wherein the client includes a networking module that is able to download the certificate of the server over the Internet.

At S204, the certificate of the server is stored in a share buffer, where the share buffer is a buffer accessible in both normal environment and secure environment. In other words, in both normal environment and secure environment, data can be stored into the share buffer, and the data that is stored in the share buffer can be obtained.

At S206, the normal environment is switched to the secure environment.

At S208, the client obtains the certificate of the server from the share buffer in the secure environment.

At S210, in the secure environment, the client verifies the certificate of the server using a pre-downloaded verification key, obtains a public key of the certificate of the server after successfully verifying the certificate of the server, and stores the public key of the certificate of the server in a secure buffer. The secure buffer is accessible only in the secure environment, that is, data stored in the secure buffer will not be attacked by malicious software.

When the secure environment is initialized, the client can download a verification key (pub_serv_CA) that is used for verifying the certificate of the server from a secure storage to the secure buffer accessible in the secure environment.

Figure 3:
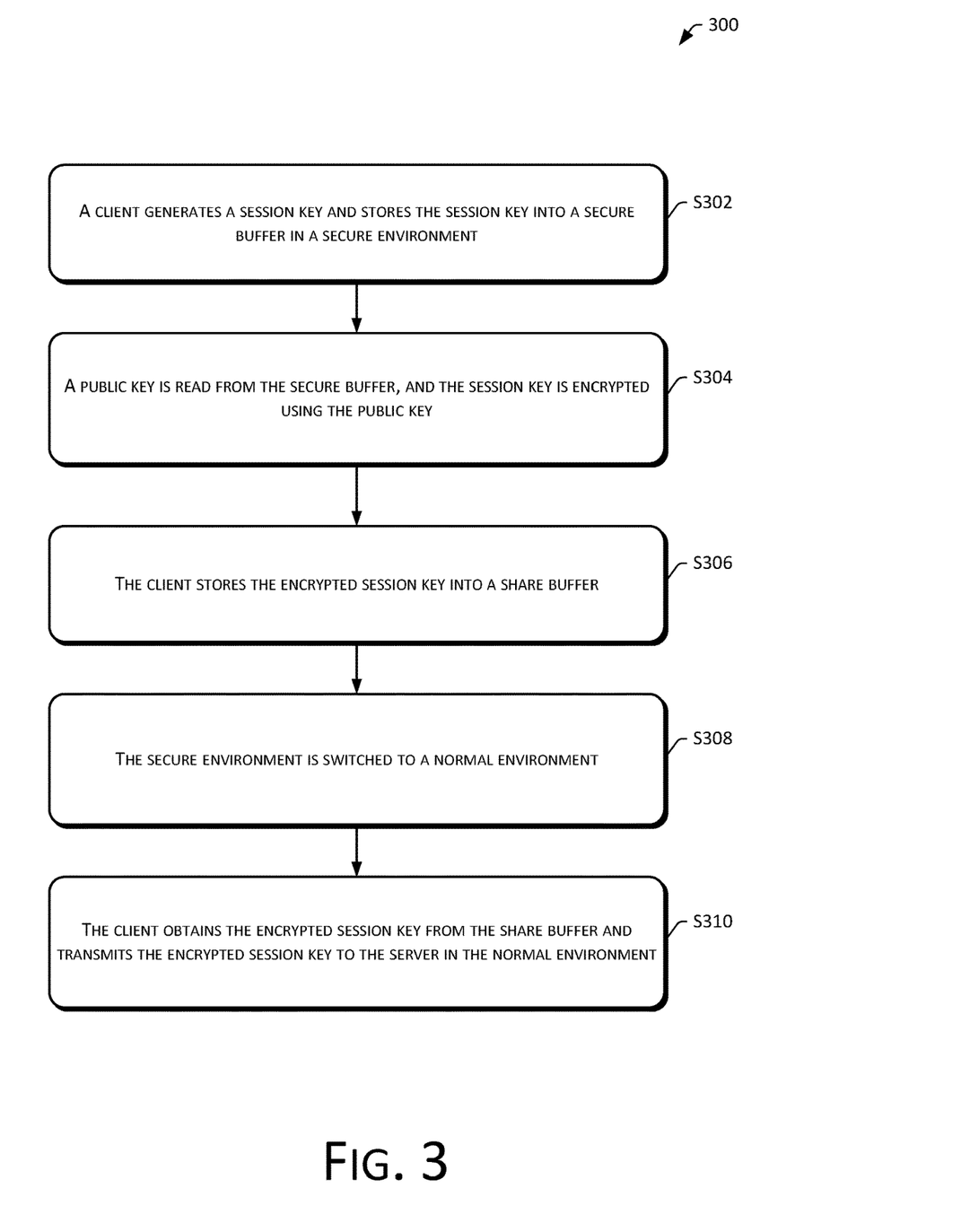
FIG. 3 is a flowchart of generating a session key and uploading thereof to a server according to an embodiment of the present disclosure.

FIG. 3 shows a flowchart of generating a session key and uploading the session key to a server according to an embodiment of the present disclosure. As shown in FIG. 3, a method 300 thereof may include the following operations.

At S302, a client generates a session key (Session Key) in a secure environment, and stores the session key into a secure buffer, where the session key is a key using a symmetric encryption algorithm, such session key is generated in each session between the client end and a server, and is terminated after the session is ended.

At S304, a stored public key is read from the secure buffer, and the session key is encrypted using the public key to obtain an encrypted session key (Session Key').

At S306, the client stores the encrypted session key into a share buffer.

At S308, the secure environment is switched to a normal environment.

At S310, the client obtains the encrypted session key from the share buffer and transmits the encrypted session key to the server in the normal environment.

In implementations, after the above operations are performed, the server obtains the session key (Session Key') that is encrypted using the public key of the server. The server may then decrypt the session key (Session Key') using a private key thereof to obtain a decrypted session key (Session Key). The session key (Session Key) is used in subsequent login and payment operations.

Figure 4:
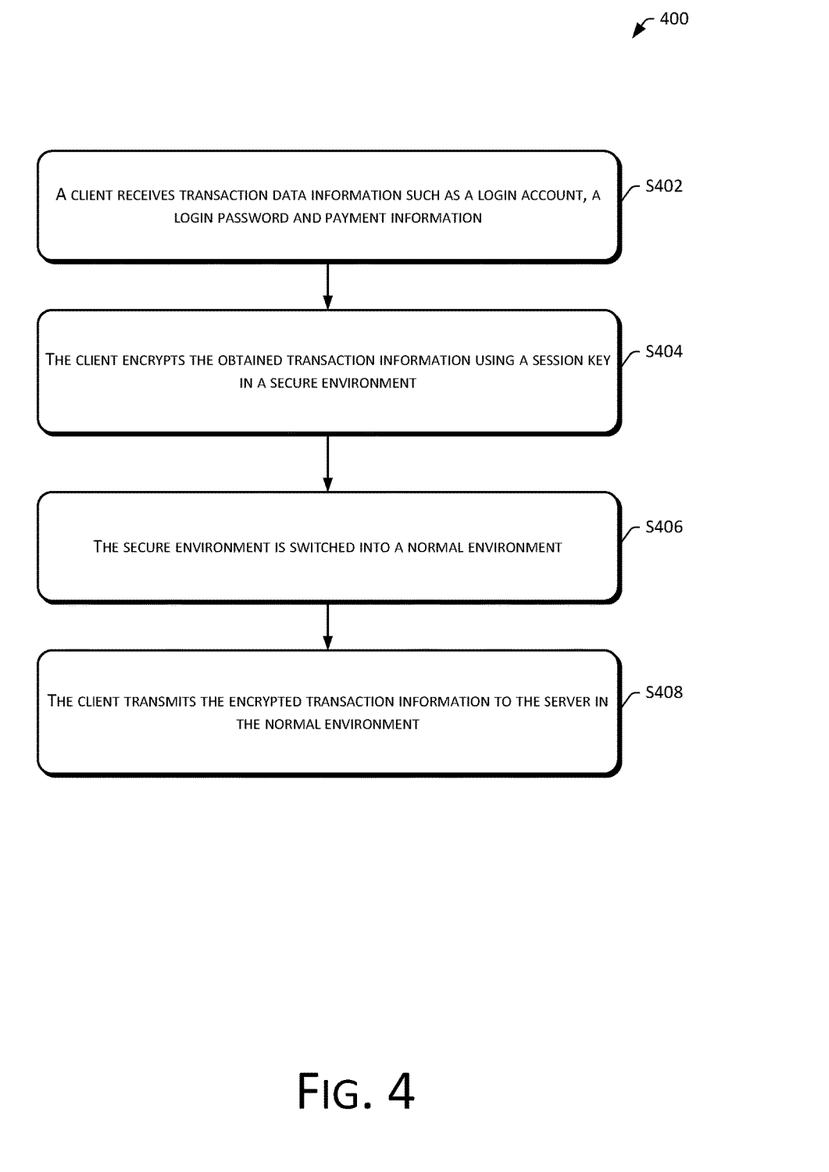
FIG. 4 is a flowchart of obtaining login information and performing a login according to an embodiment of the present disclosure.

FIG. 4 is a flowchart of obtaining login information and performing a login according to an embodiment of the present disclosure. As shown in FIG. 4, a method 400 thereof may include the following operations.

At S402, a client receives transaction data information such as a login account, a login password and payment information. In implementations, the payment information may include, but is not limited to, an account number tag (Tag), a payment amount, a bill number, payment merchant information, etc. In implementations, the login account may be received in a normal environment, and the login password and the payment information may be received in a secure environment. Alternatively, the login account number, the login password, and the payment information may be received in the secure environment.

In a real application, transaction data information may be inputted by a user using an input device such as an infrared (IR) remote control, or a Bluetooth/WiFi remote control, etc. The inputted data, such as a login password and payment information, may directly be stored into a secure buffer.

At S404, the client encrypts the obtained transaction information using a session key in a secure environment.

At S406, the secure environment is switched into a normal environment.

At S408, the client transmits the encrypted transaction information to the server in the normal environment.

In implementations, after receiving the transaction information that is encrypted using the session key, the server may decrypt the received transaction information using the session key obtained in FIG. 3 to obtain decrypted data information such as the login account, the login password, and the payment information. The server may then verify an identity of the client based on the transaction information and perform operations such as subsequent transaction, which is not redundantly described in detail herein.

Figure 5:
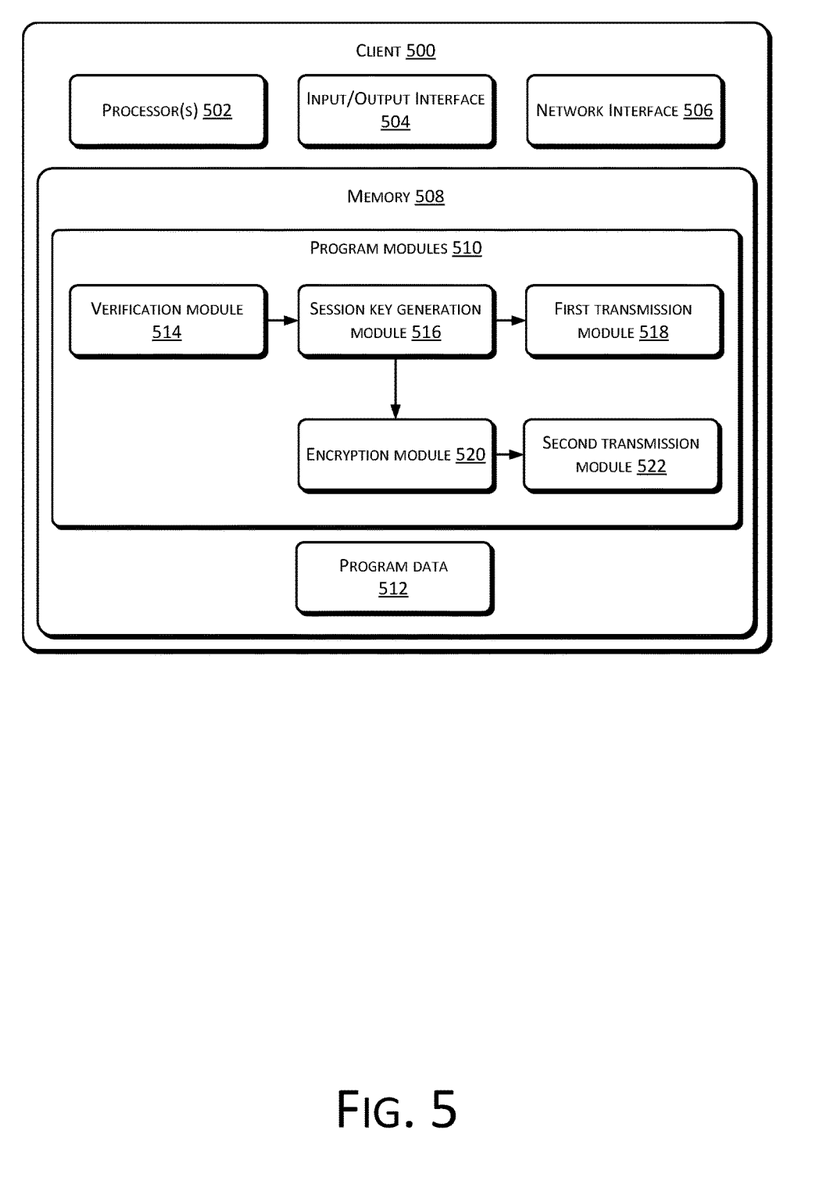
FIG. 5 is a structural diagram of a client according to an embodiment of the present disclosure.

FIG. 5 shows a structural block diagram of a client 500 according to an embodiment of the present disclosure. The client may be a smart television client or a set-top box client. Moreover, the client has passed a check and/or an authorization by a secure environment in advance, and thus is able to access a specified buffer (secure buffer) and a specified storage (secure storage) in the secure environment. In other words, the client can perform operations in the secure environment. In implementations, the client may include one or more computing devices. In a typical configuration, a computing device includes one or more Central Processing Units (CPUs), I/O interfaces, network interfaces and memory. By way of example and not limitations, the client 500 may include one or more processors 502, an input/output (I/O) interface 504, a network interface 506 and memory 508.

The memory 508 may include a form of computer-readable media, e.g., a non-permanent storage device, random-access memory (RAM) and/or a nonvolatile internal storage, such as read-only memory (ROM) or flash RAM. The memory 508 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 508 may include program modules 510 and program data 512. The program module 510 may include a verification module 514, a session key generation module 516, a first transmission module 518, an encryption module 520 and a second transmission module 522. The structures and functions of the modules are described in detail hereinafter.

The verification module 514 performs verification of a server in a secure environment, and obtain a public key of the server after the verification is passed. The session key generation module 516 generates a session key, and encrypts the session key using the public key in the secure environment. The first transmission module 518 transmits the encrypted session key to the server in a normal environment. Furthermore, the session key generation module 516 stores the encrypted session key into a share buffer. After the secure environment is switched into the normal environment, the first transmission module 518 obtains the encrypted session key from the share buffer and transmits the encrypted session key to the server in the normal environment. The encryption module 520 encrypts pre-obtained transaction information using the session key in the secure environment, where the transaction information includes a login account, a login password and payment information. The second transmission module 522 transmits the encrypted transaction information to the server in the normal environment. In implementations, the first transmission module 518 and the second transmission module 522 may be integrated together, which is not repeatedly described in detail herein.

Figure 6:
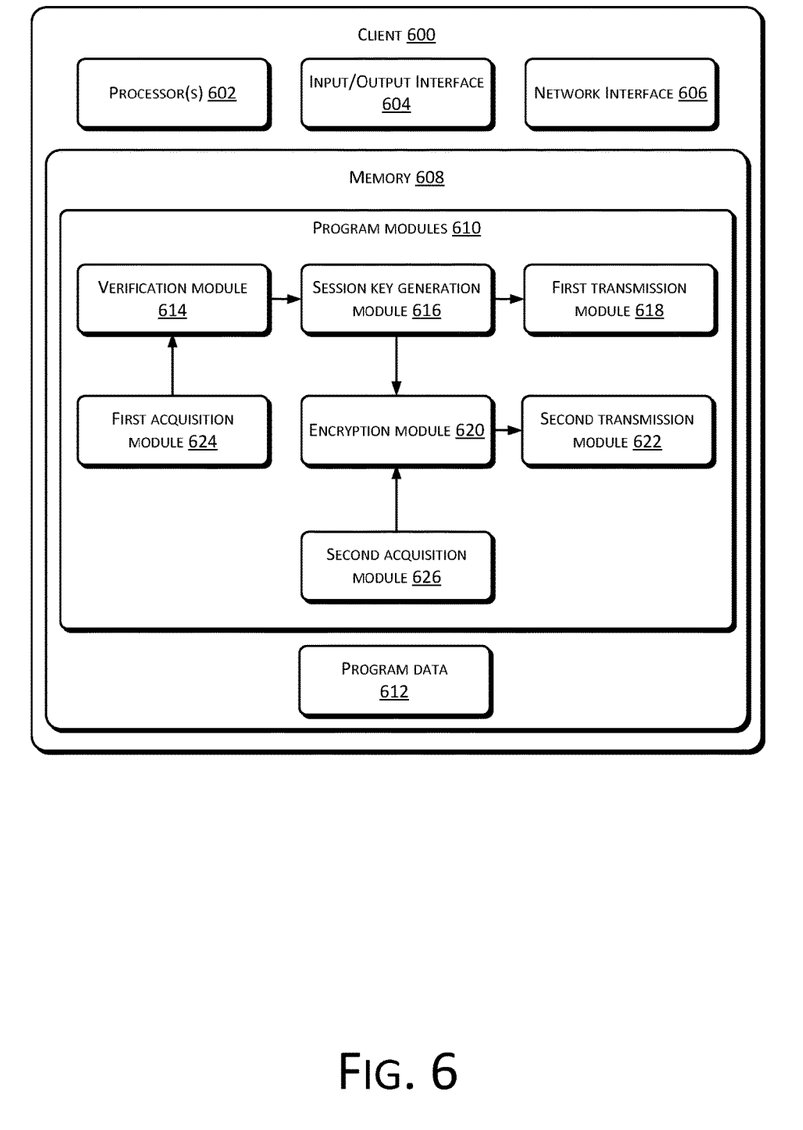
FIG. 6 is a structural diagram of a client according to another embodiment of the present disclosure.

FIG. 6 shows a structural block diagram of a client 600 according to another embodiment of the present disclosure. As shown in FIG. 6, the client 600 may include one or more processors 602, an input/output (I/O) interface 604, a network interface 606 and memory 608. The memory 608 may include a form of computer-readable media as described in the foregoing description.

In implementations, the memory 608 may include program modules 610 and program data 612. The program module 610 may include a verification module 614, a session key generation module 616, a first transmission module 618, an encryption module 620, a second transmission module 622, a first acquisition module 624, and a second acquisition module 626. In implementations, the verification module 614, the session key generation module 616, the first transmission module 618, the encryption module 620 and the second transmission module 622 are similar to the verification module 514, the session key generation module 516, the first transmission module 518, the encryption module 520, and the second transmission module 522 as shown in FIG. 5 respectively, and thus are not repeatedly described in detail herein.

In implementations, the first acquisition module 624 may download a certificate of the server via a network in the normal environment, store the certificate of the server into the share buffer, and obtain the certificate of the server from the share buffer under the secure environment after the normal environment is switched to the secure environment. Furthermore, the verification module 614 verifies the certificate of the server obtained by the first acquisition module 624 using a pre-downloaded verification key, and stores the public key of the certificate of the server into the secure buffer in the secure environment after successfully verifying the certificate of the server.

In implementations, the second acquisition module 626 may receive a login account in the normal environment, and receive a login password and payment information in the secure environment. Alternatively, the second acquisition module 626 may receive the login account number, the login password and the payment information in the secure environment. Furthermore, the encryption module 620 may obtain transaction information through the second acquisition module 626 and performs an encryption processing thereon.

In the present disclosure, the operations of the methods and the structural features of the apparatuses are corresponding to each other, and thus can be cross-referenced. Details thereof are not repeatedly described herein.

According to the technical solutions of the present disclosure, by performing operations, such as a server certificate check, generation and encryption of a session key, secure input and secure transmission of transaction-related information, etc., in a secure environment, the security of user login information and private information is effectively ensured.

One skilled in the art should understand that the embodiments of the present disclosure may be provided as a method, a system or a computer program product. Therefore, the present disclosure may be implemented in a form of a completely hardware embodiment, a completely software embodiment, or an embodiment of a combination of software and hardware. Moreover, the present disclosure may be achieved in a form of a computer program product that is implemented on one or more computer usable storage media (including, but not limited to, a magnetic disk memory, a CD-ROM, an optical memory, etc.) that include computer usable program codes.

It should further be noted that terms such as "comprise", "include" or any other variations thereof are intended to cover non-exclusive inclusion, so that a process, method, product or apparatus that includes a series of elements would not only include these elements, but also include other element(s) that is/are not explicitly listed, or further include element(s) that is/are inherent in the process, method, product or apparatus. Without further restrictions, an element defined by a phrase "comprising a . . . " does not preclude an additional inclusion of other identical element(s) in a process, method, product or apparatus that include this element.

Exemplary embodiments of the present disclosure are described in the foregoing, and are not intended to limit the present disclosure. One skilled in the art should understand that the present disclosure may have various modifications and variations. Any modification, equivalent replacement, improvement or the like made with the spirit and principle of the present disclosure should be included within the scope of appended claims of the present disclosure.

What is claimed is:

1. A method implemented by a client including one or more computing devices, the method comprising:
    downloading a certificate of a server;
    storing the certificate of the server into a share buffer in a normal environment, the share buffer being accessible in both the normal environment and a secure environment;
    performing verification of a server in the secure environment;
    storing a public key of the certificate of the server into a secure buffer in the secure environment after successfully verifying the certificate of the server, the secure buffer being accessible in the secure environment and not accessible in the normal environment;
    obtaining the public key in the secure environment;
    generating a session key and encrypting the session key using the public key in the secure environment, the session key being generated by the client in a respective session between the client and the server, the session key being terminated after the respective session is ended;

transmitting the encrypted session key to the server in the normal environment;

encrypting pre-obtained transaction information using the session key in the secure environment; and transmitting the encrypted transaction information to the server in the normal environment.

2. The method of claim 1, further comprising:
obtaining the certificate of the server from the share buffer in the secure environment after switching from the normal environment to the secure environment.

3. The method of claim 2, wherein the performing the verification of the server in the secure environment includes verifying the certificate of the server using a pre-downloaded verification key.

4. The method of claim 1, further comprising:
storing the encrypted session key into the share buffer after the session key is encrypted using the public key; and
obtaining the encrypted session key from the share buffer in the normal environment, and transmitting the encrypted session key to the server in the normal environment after switching from the secure environment to the normal environment.

5. The method of claim 1, wherein the transaction information includes a login account, a login password and payment information.

6. The method of claim 5, wherein the login account is received in the normal environment, and the login password and the payment information is received in the secure environment.

7. The method of claim 5, wherein the login account, the login password and the payment information are received in the secure environment.

8. The method of claim 1, wherein the client device comprises a smart television or a set-top box.

9. A client device comprising:
one or more processors;
memory;
a first acquisition module stored in the memory and executable by the one or more processors to download a certificate of a server, store the certificate of the server into a share buffer in a normal environment, the share buffer being accessible in both the normal environment and a secure environment, an operation of codes in the secure environment being limited to trusted codes that pass a signature verification;
a verification module stored in the memory and executable by the one or more processors to perform verification of the server in the secure environment, store a public key of the certificate of the server into a secure buffer in the secure environment after successfully verifying the certificate of the server, the secure buffer being accessible in the secure environment and not accessible in the normal environment, and obtain the public key in the secure environment;
a session key generation module stored in the memory and executable by the one or more processors to generate a session key in the secure environment, and encrypt the session key using the public key in the secure environment, the session key being generated by the client device in a respective session between the client device and the server, the session key being terminated after the respective session is ended;

a first transmission module stored in the memory and executable by the one or more processors to transmit an encrypted session key to the server in the normal environment;

an encryption module stored in the memory and executable by the one or more processors to encrypt pre-obtained transaction information using the session key in the secure environment; and a second transmission module stored in the memory and executable by the one or more processors to transmit the encrypted transaction information to the server in the normal environment.

10. The client device of claim 9, wherein the first acquisition module further obtains the certificate of the server from the share buffer in the secure environment after the normal environment is switched to the secure environment.

11. The client device of claim 10, wherein the verification module further verifies the certificate of the server using a pre-downloaded verification key in the secure environment.

12. The client device of claim 9, wherein the session key generation module further stores the encrypted session key into the share buffer, and wherein the first transmission module further obtains the encrypted session key from the share buffer in the normal environment, and transmit the encrypted session key to the server after the secure environment is switched to the normal environment.

13. The client device of claim 9, wherein the transaction information includes a login account, a login password and payment information.

14. The client device of claim 13, further comprising a second acquisition module stored in the memory and executable by the one or more processors to receive the login account in the normal environment, and receive the login password and the payment information in the secure environment.

15. The client device of claim 13, further comprising a second acquisition module stored in the memory and executable by the one or more processors to receive the login account, the login password and the payment information in the secure environment.

16. The client device of claim 9, wherein the client has passed a security check and/or an access authorization of the secure environment in advance.

17. One or more computer-readable media storing executable instructions that, when executed by one or more processors, cause the one or more processors to perform acts comprising:
downloading a certificate of a server;
storing the certificate of the server into a share buffer in a normal environment, the share buffer being accessible in both the normal environment and a secure environment, an operation of codes in the secure environment being limited to trusted codes that pass a signature verification;
performing verification of the server in the secure environment;
storing a public key of the certificate of the server into a secure buffer in the secure environment after successfully verifying the certificate of the server, the secure buffer being accessible in the secure environment and not accessible in the normal environment;
obtaining the public key in the secure environment;
generating a session key and encrypting the session key using the public key in the secure environment, the session key being generated by a client in a respective session between the client and the server, the session key being terminated after the respective session is ended;

transmitting the encrypted session key to the server in the normal environment;

encrypting pre-obtained transaction information using the session key in the secure environment; and transmitting the encrypted transaction information to the server in the normal environment.

18. The one or more computer-readable media of claim 17, the acts further comprising:

obtaining the certificate of the server from the share buffer in the secure environment after switching from the normal environment to the secure environment.

19. The one or more computer-readable media of claim 18, wherein the performing the verification of the server in the secure environment includes verifying the certificate of the server using a pre-downloaded verification key.

20. The one or more computer-readable media of claim 18, the acts further comprising:

storing the encrypted session key into a share buffer after the session key is encrypted using the public key;

obtaining the encrypted session key from the share buffer in the normal environment; and transmitting the encrypted session key to the server in the normal environment after switching from the secure environment to the normal environment.

* * * * *